(12) United States Patent
Wünn et al.

(10) Patent No.: US 9,364,796 B2
(45) Date of Patent: Jun. 14, 2016

(54) HYDROPHOBIC OR OLEOPHOBIC MICROPOROUS POLYMER MEMBRANE WITH STRUCTURALLY INDUCED BEADING EFFECT

(71) Applicants: Eberhard Wünn, Göttingen (DE); Tobias Schleuss, Göttingen (DE)

(72) Inventors: Eberhard Wünn, Göttingen (DE); Tobias Schleuss, Göttingen (DE)

(73) Assignee: Sartorius Stedim Biotech GmbH, Goettingen (DE)

( * ) Notice: Subject to any disclaimer, the term of this patent is extended or adjusted under 35 U.S.C. 154(b) by 0 days.

(21) Appl. No.: 14/364,824

(22) PCT Filed: Oct. 18, 2012

(86) PCT No.: PCT/EP2012/004364
§ 371 (c)(1),
(2) Date: Jun. 12, 2014

(87) PCT Pub. No.: WO2013/087131
PCT Pub. Date: Jun. 20, 2013

(65) Prior Publication Data
US 2015/0007721 A1    Jan. 8, 2015

(30) Foreign Application Priority Data

Dec. 13, 2011 (DE) .......................... 10 2011 121 018

(51) Int. Cl.
| | | |
|---|---|---|
| *B01D 69/02* | (2006.01) | |
| *B01D 67/00* | (2006.01) | |
| *B01D 19/00* | (2006.01) | |
| *B01D 46/00* | (2006.01) | |

(52) U.S. Cl.
CPC ............ *B01D 69/02* (2013.01); *B01D 19/0031* (2013.01); *B01D 46/0028* (2013.01); *B01D 67/0086* (2013.01); *B01D 67/0088* (2013.01); *B01D 67/0093* (2013.01); *B01D 2323/04* (2013.01); *B01D 2325/06* (2013.01); *B01D 2325/38* (2013.01)

(58) Field of Classification Search
CPC .......... B01D 19/0031; B01D 67/0086; B01D 67/0088; B01D 67/0093; B01D 69/00; B01D 69/02; B01D 46/00; B01D 46/028; B01D 2323/04; B01D 2325/04; B01D 2325/38
USPC .................................. 95/46; 96/4, 6; 210/640
See application file for complete search history.

(56) References Cited

U.S. PATENT DOCUMENTS

| | | | |
|---|---|---|---|
| 7,323,033 B2 * | 1/2008 | Kroupenkine et al. ........... 95/45 |
| 2004/0025693 A1 * | 2/2004 | Bedingfield et al. ............ 95/273 |
| 2007/0278109 A1 | 12/2007 | Kendig et al. | |
| 2008/0142441 A1 | 6/2008 | Pashley | |
| 2009/0202876 A1 | 8/2009 | Shimamura et al. | |
| 2009/0235625 A1 * | 9/2009 | Bansal et al. ................... 55/524 |
| 2010/0050871 A1 * | 3/2010 | Moy et al. ....................... 95/273 |
| 2010/0282680 A1 * | 11/2010 | Su et al. ........................ 210/640 |
| 2010/0313758 A1 * | 12/2010 | Stevens et al. .................... 96/10 |
| 2011/0104021 A1 * | 5/2011 | Curello et al. ................. 422/240 |
| 2011/0188247 A1 * | 8/2011 | Huang et al. .................... 55/486 |
| 2013/0083528 A1 * | 4/2013 | Huang et al. ...................... 96/12 |
| 2013/0306560 A1 * | 11/2013 | Deratani et al. .............. 210/650 |
| 2014/0275692 A1 * | 9/2014 | Patel et al. ..................... 585/818 |

FOREIGN PATENT DOCUMENTS

| | | | | |
|---|---|---|---|---|
| CA | 2 485 808 | 4/2005 | | |
| EP | 1 710 011 | 10/2006 | | |
| JP | 2003-144868 | 5/2003 | | |
| WO | WO 99/15252 | * 4/1999 | ............ B01D 19/00 |
| WO | WO99/15252 | 4/1999 | | |
| WO | WO 2004/048450 | 6/2004 | | |

* cited by examiner

*Primary Examiner* — Jason M Greene
(74) *Attorney, Agent, or Firm* — McDonnell Boehnen Hulbert & Berghoff LLP

(57) ABSTRACT

The present invention relates to a hydrophobic or oleophobic microporous polymer membrane having a structurally induced drip-off effect, to methods for producing the membrane according to the invention, to the use of the membrane in the sterile filtration of gaseous fluids, and to the use of the membrane as a liquid barrier in liquid-containing systems to be vented.

14 Claims, 3 Drawing Sheets

Figure 1
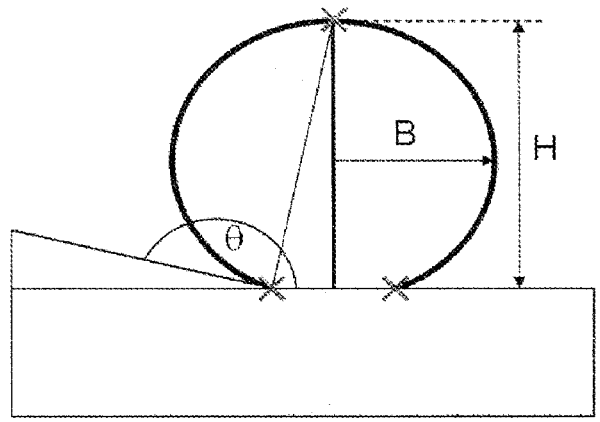
Figure 2.1
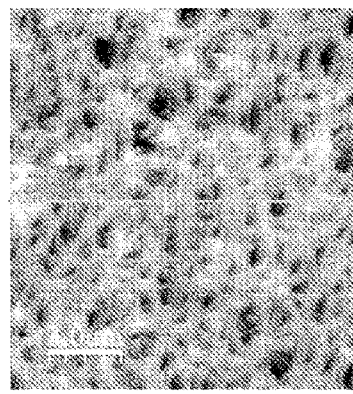 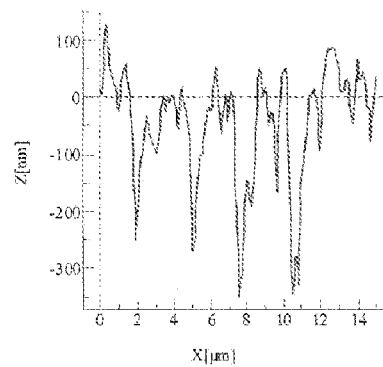
Figure 2.2
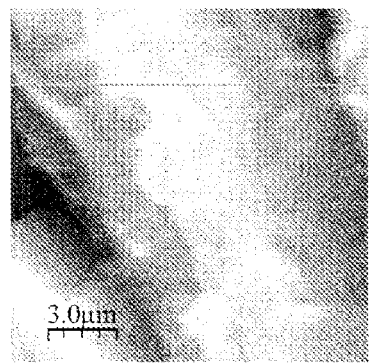 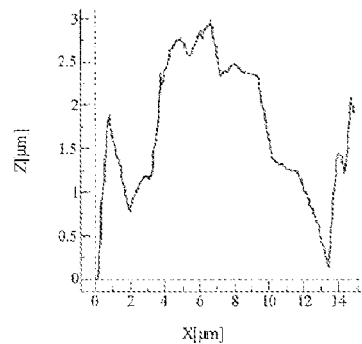

Figure 2.3
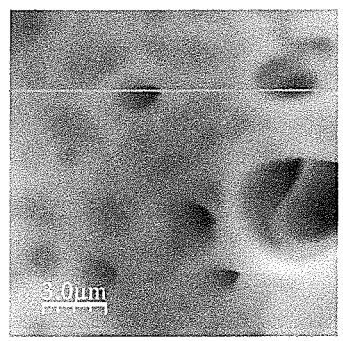 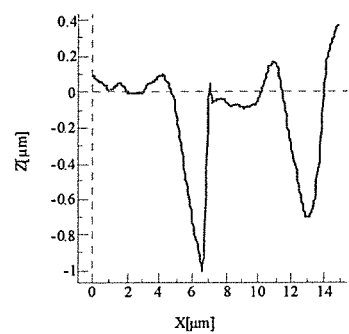
Figure 2.4
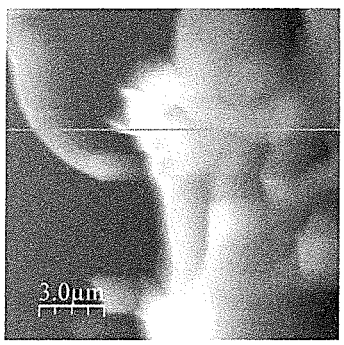 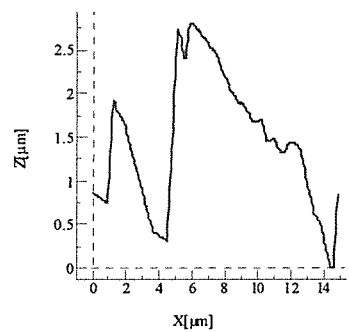
Figure 2.5
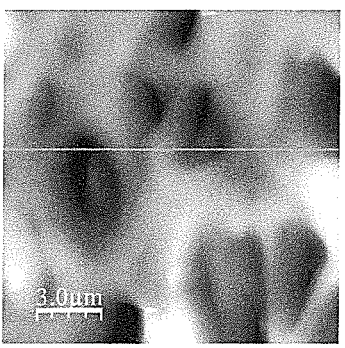 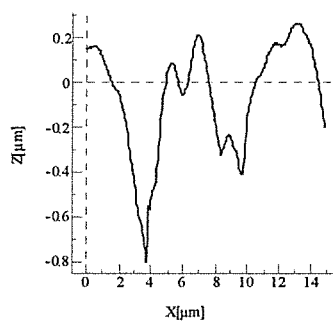

Figure 2.6
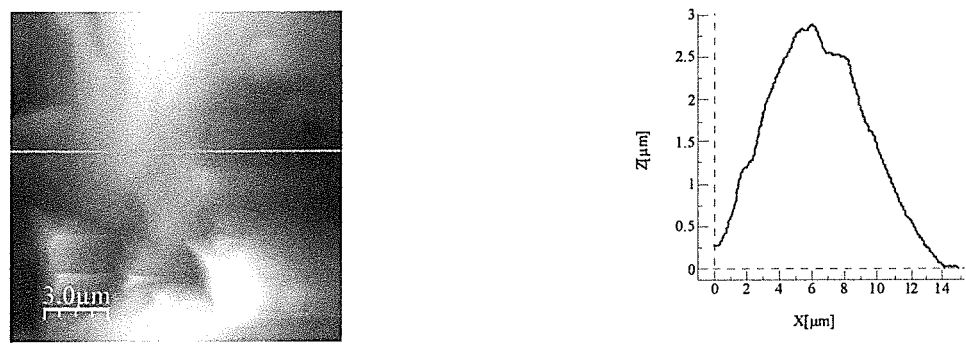
Figure 3
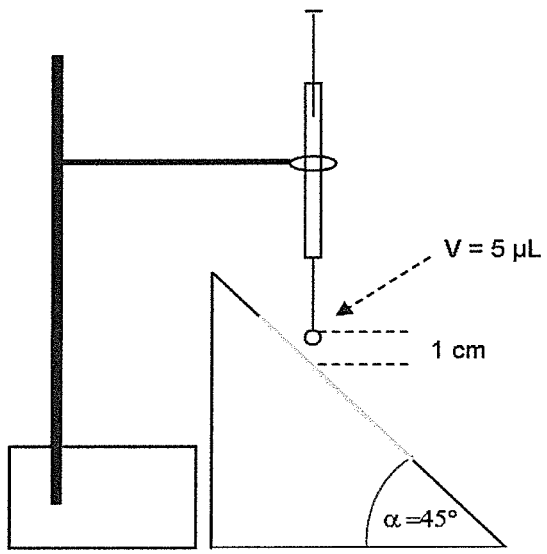

HYDROPHOBIC OR OLEOPHOBIC MICROPOROUS POLYMER MEMBRANE WITH STRUCTURALLY INDUCED BEADING EFFECT

FIELD OF THE INVENTION

The present invention relates to a hydrophobic or oleophobic microporous polymer membrane having a structurally induced drip-off effect, to methods for producing the membrane according to the invention, to the use of the membrane in the sterile filtration of gaseous fluids, and to the use of the membrane as a liquid barrier in liquid-containing systems to be vented.

BACKGROUND OF THE INVENTION

Customary method steps in the industrial use of reusable metal containers are cleaning and sterilization with superheated steam, and filling, temperature-adjustment, transport and emptying of liquids. With the exception of the cleaning step, the processes mentioned require a sterile-filtration venting element (venting device) on at least one container opening (flange) in order to prevent equipment damage owing to positive or negative pressure and, at the same time, to ensure the absence of microbes in the solution-contacted interior during venting.

The venting element is the interface between a preferably sterile, liquid-containing container interior (for example, in the form of a liquid barrier in dialysis devices, infusion solution containers or in fermenters) and an exterior, preferably nonsterile atmosphere. In most cases, a sterile-filtration membrane filter composed of a synthetic polymer is selected as the actual separation medium in the venting element. In rare cases, a nonwoven composed of synthetic fiber material is incorporated.

In many cases, synthetic polymers have hydrophobic surface properties which are attributed to the intrinsic hydrophobicity of the synthetic materials. The hydrophobicity is a material constant. It is caused by the extramolecular interactions of the atom groups forming the polymer.

Owing to their low surface tension with respect to water, these materials have reduced wettability with aqueous and polar media. For smooth, nonporous surfaces, the contact angle with respect to water is a measure of the surface tension. Surfaces with a contact angle of more than 90° with respect to water are referred to as hydrophobic. Hydrophobic substances are not miscible or wettable with water. The substances are usually nonpolar and their surface tension is below 72 mN/m at 20° C. Oleophobic substances, which have an especially high hydrophobicity, are not miscible or wettable with oils and other nonpolar substances. Their surface tension is less than 21 mN/m at 20° C. Typical surface tensions of polymers which are processed to form membranes and their contact angles with respect to water are listed in table 1.

TABLE 1

Surface tensions of smooth, nonporous polymers and their contact angles with respect to water

| Polymer | Surface tension [mN/m] | Contact angle with respect to water [°] |
|---|---|---|
| Polyamide (nylon) | 75[a] | 49[a] |
| Polyethersulfone (PES) | 58[a] | 54[a] |
| Polyetheretherketone (PEEK) | 49[a] | 71[a] |
| Polyethylene (PE) | 31[b] | 94[b] |
| Polyvinylidene fluoride (PVDF) | 25[b] | 85[b] |
| Polytetrafluoroethylene (PTFE) | 18.5[b] | 108[b] |

[a]Membrane Science and Technology Series, 11, "Membrane Contactors: Fundamentals, Applications and Potentialities", 2005, E. Drioli et al.
[b]J. Appl. Polym. Sci., 1969, 13, 1741-1747, D. K. Owens et al.

The hydrophobic character of the sterile-filtration separation medium is a prerequisite for incorporation into a venting element for two different reasons. Firstly, no closed water film must form on the surface of or within the separation medium upon contact with water or aqueous medium or, in particular, steam (during steaming or gassing of bioreactors). The water film would prevent the pressure exchange (gas exchange) between the inner and outer atmosphere and thereby compromise the mechanical integrity of the container. In this case, a strong hydrophobicity (e.g., as in the case of fluorine-containing organic polymers) through to the oleophobic character of the separation medium is advantageous.

For instance, venting applications make use of customary materials for membrane filters, such as polytetrafluoroethylene (PTFE), polypropylene (PP) and polyvinylidene fluoride (PVDF), and polyethylene (PE) is used in the case of fiber material.

As is evident from table 1, perfluorinated materials, such as polytetrafluoroethylene (PTFE) for example, exhibit especially hydrophobic properties. If the starting polymer does not contain any fluorine substituents, as is the case for example for polysulfone (PSU) or polyethersulfone (PES), a modification of the membrane surface with fluorine-containing agents in monomeric, oligomeric or polymeric form is possible in order to lower the surface tension of the polymer, and so wetting with liquids of low surface tension, such as surfactant solutions, alcohols or oils for example (cf. table 2), does not occur.

TABLE 2

Surface tension of liquids

| Liquid | Surface tension [mN/m] |
|---|---|
| Water | 72.88[a] |
| Paraffin | 23[b] |
| Ethanol | 22.3[c] |
| Methanol | 22.5[c] |
| n-Octane | 21.8[a] |

[a]A. W. Adamson, Physical Chemistry of Surfaces, 6th ed., Wiley 1997
[b]J. Appl. Polym. Sci., 1969, 13, 1741-1747, D. K. Owens et al.
[c]J. Chem. Eng. Data, 1981, 26, 323-333, G. Körösi et al.

In the prior art, various methods for providing membranes having both hydrophobic and oleophobic properties have been described.

For instance, U.S. Pat. No. 5,217,802 and U.S. Pat. No. 5,286,382 describe porous membranes having a polymer coating which originates from the in situ crosslinking of polymers produced from monomers having fluorine substituents. The monomers preferably used are fluoroalkene, fluoroacrylate or fluorostyrene derivatives or fluoroalkylsiloxanes. The membranes provided with the polymer coating have a surface tension of more than 21 dynes/cm (21 mN/m).

WO 2009/065092 A1 discloses microporous textile-reinforced polyolefin membranes composed of PE, the main surfaces of which are rendered selectively hydrophobic and oleophobic, i.e., having surface tensions of less than 21 mN/m, by an impregnation method. By means of the aforementioned impregnation method, it is possible for one main surface of the microporous PE membrane to be made oleophobic with a fluorine substituent-containing polymer, whereas the opposite main surface of the PE membrane retains its hydrophobic starting properties. A disadvantage of these membranes known from WO 2009/065092 A1, which have been proven effective in principle as breathable materials in clothing manufacture, is that they do not exhibit sufficient resistance with respect to high-energy radiation, for example gamma radiation, and have only inadequate temperature stability.

U.S. Pat. No. 6,579,342 B2 describes the production of an oleophobic venting filter for fluids to be administered intravenously. The venting filter is produced by grafting a fluorosulfone oligomer having perfluorinated alkylsulfonamide groups onto a polymeric substrate. The polymeric substrate involves preferably poly(ether)sulfones, polyamide, PVDF, polyacrylates or PTFE.

Such filter membranes from the prior art are characterized by a distinctly lower surface tension than the nonwetting medium, caused by the chemical properties of the membrane surface.

A self-cleaning effect with water or aqueous media is achieved on intrinsically hydrophobic materials, for example polymers as listed in table 1. This effect is used technically to obtain self-cleaning materials, since dirt particles on such coatings have only few separate contact points with the surface and can therefore be easily rinsed off.

This drip-off effect, the so-called "lotus effect", is familiar to nonporous surfaces such as films, textile fibers or metal parts and is, for example, achieved by imprinting and impressing surface structures or by partly removable application of particulate coatings. This lotus effect which is used technically is modelled on the self-cleaning effect observed in lotus plants. In lotus plants, this self-cleaning effect is caused by a hydrophobic double structure of the surface, whereby the contact area and thus the adhesion force between the surface and the overlying particles and water drops is greatly reduced to such an extent that self-cleaning occurs. This double structure is the result of a characteristically formed epidermis of the lotus plants, with waxes being situated on the outermost epidermal layer. These supported waxes are hydrophobic and form the second part of the double structure. Thus, it is no longer possible for water to reach the interspaces of the leaf surface, and so the contact area between surface and water is drastically reduced.

EP 2 011 629 A1 discloses microarrays which have a polymer coating and on which surface regions can be selectively roughened and hydrophobicized by laser irradiation in order to produce a lotus effect. The laser irradiation is preferably carried out at an energy density which only leads to roughening of the surface but not to removal of polymer material from the irradiated surface, i.e., the energy density is below the ablation limit.

SUMMARY OF THE INVENTION

It is an object of the present invention to provide a hydrophobic or oleophobic microporous polymer membrane which has an increased liquid-repellent property and is thereby especially suitable as a liquid barrier or blocking membrane in systems to be vented. The provided polymer membrane shall in addition allow residue-free drip-off of a liquid medium from the membrane surface in order to thus prevent undesired spreading of the medium on the surface.

This object is achieved by the embodiments of the present invention that are characterized in the claims.

In particular, the invention provides a hydrophobic or oleophobic microporous polymer membrane having a structurally induced drip-off effect, wherein at least one main surface of the polymer membrane is roughened and has a contact angle with respect to water of at least 125°. In the context of the present invention, "main surfaces" are to be understood to mean the two outer surfaces of a membrane, which are connected to one another by pores through the thickness of the membrane body.

DESCRIPTION OF THE FIGURES

FIG. 1: Determination of the static contact angle according to the invention with respect to water:

FIG. 2.1: AFM image together with height profile of the main surface of a PES membrane (0.2 µm pore size) having customary, smooth main surface;

FIG. 2.2: AFM image together with height profile of the main surface of a PES membrane (0.2 µm pore size) having an inventive, roughened main surface;

FIG. 2.3: AFM image together with height profile of the main surface of a PES membrane (1.2 µm pore size) having a customary, smooth main surface;

FIG. 2.4: AFM image together with height profile of the main surface of a PES membrane (1.2 µm pore size) having an inventive, roughened main surface;

FIG. 2.5: AFM image together with height profile of the main surface of a PES membrane (3 µm pore size) having a customary, smooth main surface;

FIG. 2.6: AFM image together with height profile of the main surface of a PES membrane (3 µm pore size) having an inventive, roughened main surface; and FIG. 3: Test assembly for example 3.

DESCRIPTION OF THE INVENTION

In the context of the present invention, "hydrophobic" and "oleophobic" are to be understood to mean polymer membranes, the surface tension of which at 20° C. is less than 72 mN/m and less than 21 mN/m, respectively. Thus, oleophobicity is an enhanced form of hydrophobicity, i.e., oleophobic membranes have an even lower surface tension than hydrophobic membranes and thus exhibit even greater liquid-repellent properties.

According to the invention, the term "microporous" describes a polymer membrane having a pore size of from 0.1 µm to 20 µm, preferably from 0.1 to 15 µm and particularly preferably from 0.2 to 10 µm.

According to the invention, the starting material for the hydrophobic or oleophobic microporous polymer membrane having a structurally induced drip-off effect is not subject to any restriction. For instance, the starting material of the polymer membrane according to the invention consists, for example, of polysulfone (PSU), polyethersulfone (PES), polyphenylene sulfide (PPS), PBI (polybenzimidazole), polyetheretherketone (PEEK) or polyamide imide (PAI), which are modified with fluorine-containing agents (as known, for example, from U.S. Pat. No. 5,217,802, U.S. Pat. No. 5,286,382, U.S. Pat. No. 6,579,342 B2, WO 2009/065092 A1 or DE 10 2010 044 648.3-44), or of pre-perfluorinated materials such as, for example, polyvinylidene fluoride (PVDF) or polytetrafluoroethylene (PTFE). Particularly preferably, the starting material of the polymer membrane according to the invention consists of polysulfone (PSU) or polyethersulfone (PES).

According to the invention, a "structurally induced drip-off effect" is understood to mean that the membrane according to the invention is roughened on at least one main surface, specifically imparting the membrane with liquid-repellent properties which induce a drip-off effect. Because of its porosity and the roughening according to the invention, the liquid-repellent properties of the membrane according to the invention are reflected in an advantageously high contact angle of the roughened main surface with respect to water, which angle is at least 125°, preferably at least 127°, particularly preferably at least 135° and most preferably at least 145°.

The contact angle defined in the context of the present invention is the static contact angle in degrees [°] with respect to ultrapure water. Analogously to ASTM-D5946-09, the contact angle θ according to the invention can be determined as per equation 1 using a commercially available goniometer (for example, the PG-3 model from FIBRO system AB) by application of a drop of ultrapure water (1 to 2 µL) to the surface to be analyzed and subsequent evaluation, where θ is the contact angle according to the invention, W is the half width of the drop and H is the height of the drop (see FIG. 1). In this procedure, the evaluation can be carried out with the aid of software (for example, PG Software from FIBRO system AB).

$$\theta = 2 \arctan(H/W) \qquad \text{(equation 1)}$$

According to the invention, at least one of the two main surfaces of the polymer membrane is roughened in order to achieve the structurally induced drip-off effect. In one embodiment of the present invention, it is also possible for both main surfaces of the polymer membrane to be roughened. In this case, the two main surfaces can have the same surface roughness or else a differing surface roughness. Membranes according to the invention in which both main surfaces have been roughened to the same extent or to a differing extent have been found to be especially effective in applications in which there is venting of a liquid-carrying system which has been placed in a humid environment in which condensation/droplet formation on the venting filter containing the membrane according to the invention can also occur from the outside.

Roughening of the at least one main surface of the polymer membrane according to the invention can be achieved by mechanical, physical and/or chemical posttreatment of a hydrophobic or oleophobic starting polymer membrane. However, roughening can also be achieved in the manufacturing process for the starting polymer membrane by mechanical, physical and/or chemical treatment, with the polymer membrane only subsequently, as known in the prior art (for example, as described in U.S. Pat. No. 5,217,802, U.S. Pat. No. 5,286,382, U.S. Pat. No. 6,579,342 B2, WO 2009/065092 A1 or DE 10 2010 044 648.3-44), being hydrophobically or oleophobically modified by means of fluorine-containing agents. Both alternatives for roughening the main surface(s) are preferably carried out in such a manner that the remaining membrane properties are not altered. The method for producing the starting polymer membrane is not subject to any restriction whatsoever. For example, the starting polymer membrane can be produced via an evaporation method or via phase inversion.

In a preferred embodiment of the present invention, at least one roughened main surface of the polymer membrane according to the invention has a surface roughness at a height of from 0.1 µm to 20 µm, preferably from 0.5 to 10 µm, particularly preferably from 1 to 5 µm. The lateral distances of the surface roughness are preferably on the same scale. According to the invention, the surface roughness is determined by means of atomic force microscopy (AFM). In this method, the surface roughness results from the arithmetic mean of individual measured values of the amplitudes of bumps, which are captured during scanning of a measurement path on an outer porous membrane surface. In this case, a "0" offset is selected such that, on the measurement path, the greatest possible number of identifiable elevations or indentations is cut in the region of maximum gradient (gradient at the edge of the pore).

FIGS. 2.1 to 2.6 show AFM images together with height profiles of the main surfaces of various membranes having a customary, smooth main surface (FIGS. 2.1, 2.3 and 2.5) and of various membranes having a main surface roughened according to the invention (FIGS. 2.2, 2.4 and 2.6). The membranes were scanned in each case by means of a commercially available atomic force microscope from Nanotec Electronica S.L. in tapping mode on at least two different positions lying more than 2 cm apart from one another. In this procedure, use was made of Olympus AC240 cantilevers (70 kHz, 2 N/m), which were operated at approximately 200 mV (20 nm) of free amplitude. The setpoint was approximately 150 mV, the scanning rate was within the range of 0.03 to 0.1 Hz per line at a resolution of 256×256 pixels (for both trace and retrace) on 15×15 µm. Reducing the scanning rate increased image quality, especially in the case of rough samples.

It is identifiable in a comparison of FIGS. 2.1 to 2.6 that, in the case of a customary, smooth surface (FIGS. 2.1, 2.3 and 2.5), the outer pores are easily identifiable and roughness only arises through surface porosity, i.e., height deviations occur particularly in a downward direction (negative height difference). However, the pictures of the membrane surfaces roughened according to the invention (FIGS. 2.2, 2.4 and 2.6) do not show any differentiated pores. In the case of these membrane surfaces, the induced roughness outweighs the pore structure, and distinctly elevated structures (positive height difference) in the desired order of magnitude are identifiable.

Table 3 shows the effect of roughening a microporous surface of different polymer membranes (material being polyethersulfone or polypropylene) with reference to contact angles with respect to water. In the comparison from smooth surface to the surface roughened according to the invention, a distinct increase in contact angles and thus an increase in advantageously liquid-repellent properties is identified.

TABLE 3

Contact angles with respect to water on a smooth surface and a surface roughened according to the invention

| Pore size and material | Nature of surface | Contact angle with respect to ultrapure water | See roughness profile |
| --- | --- | --- | --- |
| 0.2 µm (PES) | Smooth | 113° ± 6° | FIG. 2.1 |
| 0.2 µm (PES) | Rough | 145° ± 6° | FIG. 2.2 |
| 0.2 µm (PP) | Smooth | 121° ± 2° | |
| 0.2 µm (PP) | Rough | 127° ± 2° | |
| 1.2 µm (PES) | Smooth | 118° ± 3° | FIG. 2.3 |
| 1.2 µm (PES) | Rough | 145° ± 2° | FIG. 2.4 |
| 3.0 µm (PES) | Smooth | 121° ± 2° | FIG. 2.5 |
| 3.0 µm (PES) | Rough | 148° ± 3° | FIG. 2.6 |

The additional roughening of the microporous membrane structure, which is in a height and width range of from 1 to 5

μm in the examples of table 3, leads, as is evident from table 3, to a targeted reduction in contact area between medium and membrane and thus to the reduction of physical interactions (adhesive forces), producing a nonwetting porous surface having a drip-off effect which, surprisingly, distinctly exceeds the drip-off effect of comparably hydrophobic or oleophobic porous polymer membranes which do not have a surface roughened according to the invention.

In a preferred embodiment of the present invention, the polymer membrane according to the invention is radiation-resistant up to 50 kGy, preferably up to 100 kGy, particularly preferably up to 1000 kGy. According to the invention, the term "radiation-resistant" is understood to mean that the loss in strength for the membrane following gamma irradiation at a dose of 50 kGy is not more than 30%, preferably not more than 20% and particularly preferably not more than 10%. In this connection, the loss in strength for the membrane according to the invention results from the reduction in the strength level of the membrane following the gamma irradiation at a dose of 50 kGy with respect to the strength level of the membrane prior to the gamma irradiation at said dose. If the strength level of the irradiated membrane is 80% of the strength level of the unirradiated membrane, the loss in strength is, according to the invention, 20%. In the context of the present invention, the strength levels of the irradiated and unirradiated membranes are described in terms of their maximum tensile force values $F_{max}$ at room temperature. To determine $F_{max}$, a membrane sample having dimensions 20 mm×150 mm is cut out for this purpose and clamped horizontally into a "Zwick Z2.5/TN1S" materials testing machine from Zwick GmbH such that the free sample length between the clamping jaws is 4 cm. The "KAP-Z 200N" force transducer (from A.S.T., 01287 Dresden, Germany) is moved at a rate of, for example, 5 cm/min. The measurement data are continuously captured and visualized by the "testXpert" device software (from Zwick GmbH, 89079 Ulm, Germany). $F_{max}$ is determined as the mean from three irradiated membrane samples or three unirradiated membrane samples. The reason for the radiation resistance preferred according to the invention of the membrane according to the invention is the increasing trend toward single use of plastic containers during processing of liquids. In contrast to metal containers, containers composed of organic polymers are not autoclaved for the purpose of sterilization, but instead typically prepared microbe-free for use by high-energy radiation, for example by gamma radiation. Therefore, a membrane exhibiting the radiation resistance preferred according to the invention is especially suitable for the sterile filtration of gaseous fluids or as a liquid barrier for systems to be vented.

The size and structure of the polymer membrane according to the invention is not subject to any restriction. Preferably, the thickness of the polymer membrane is between 10 μm and 350 μm. In one embodiment of the present invention, the polymer membrane has a sponge structure, it being possible for the foam structure to be symmetric or asymmetric. Moreover, the polymer membrane according to the invention can also have an hourglass structure or funnel structure.

Moreover, the polymer membrane according to the invention can have a hydrophobicity gradient as described in DE 10 2010 044 648.3-44.

Furthermore, methods according to the invention for producing the polymer membrane according to the invention are provided.

In one embodiment of the method for producing the polymer membrane according to the invention, the method comprises:

providing a hydrophobic or oleophobic starting polymer membrane; and
roughening at least one main surface of the starting polymer membrane by mechanical, physical and/or chemical treatment.

In the first step of the method according to the invention, a starting membrane which has hydrophobic or oleophobic properties is provided. The starting membrane can be produced by means of, for example, an evaporation method or phase inversion. In the second step of the method, at least one main surface of the starting polymer membrane is roughened according to the invention by mechanical, physical and/or chemical treatment. The manner of roughening is not subject to any restriction. For example, the at least one surface can be roughened according to the invention by brief contact with a rotating steel roller having an incised rhomboid structure, by sanding using sandpaper or by chemical etching. Roughening is preferably carried out in such a way that the remaining membrane properties of the polymer membrane are not altered.

In an alternative embodiment of the method for producing the polymer membrane according to the invention, the method comprises:

providing a starting polymer membrane;
roughening at least one main surface of the starting polymer membrane by mechanical, physical and/or chemical treatment; and
subsequently hydrophobically or oleophobically modifying the polymer membrane roughened in the preceding step.

In the first step of the alternative method for producing the polymer membrane according to the invention, a starting polymer membrane is provided which need not yet have, but can have, hydrophobic or oleophobic properties. In the second step, at least one main surface of the starting polymer membrane is, as described above, roughened according to the invention by mechanical, physical and/or chemical treatment. Subsequently, the polymer membrane roughened according to the invention is, as is known in the prior art, hydrophobically or oleophobically modified.

Lastly, the present invention provides for the use of the microporous polymer membrane according to the invention having a drip-off effect in the sterile filtration of gaseous fluids and for the use of the microporous polymer membranes according to the invention having a drip-off effect as a liquid barrier in liquid-containing systems to be vented.

Owing to its surface roughness induced according to the invention, the polymer membrane of the present invention exhibits, surprisingly, an advantageous additional drip-off effect (lotus effect) on a nonwettable, porous polymer membrane, which already has an intrinsic surface roughness as a result of the porosity of its two main surfaces. Owing to the synergism resulting from porosity, hydrophobicity and/or oleophobicity and additional roughening according to the invention and the associated increased liquid-repellent properties, the polymer membrane according to the invention is especially suitable as a liquid barrier in liquid-containing systems to be vented or as a blocking membrane for media-carrying systems. Moreover, the surface roughness increased according to the invention advantageously prevents spreading of a liquid medium on the outer surface of the membrane, leading to a spontaneous residue-free drip-off of the medium when the polymer membrane is placed at an angle or vertically. Therefore, the polymer membrane according to the invention is especially suitable as a sterile venting filter, as used in bioreactors for example, since in this case the drip-off of the aqueous medium is necessary in order that the surface of the filter is not blocked by the hydrophilic medium, which would impair gas exchange with the bioreactor's surroundings.

The present invention will now be more particularly elucidated with reference to the following nonrestricting examples.

EXAMPLES

Example 1

A sterile venting filter containing an oleophobic planar filter polymer membrane having a sponge structure, which membrane, after having being produced according to the precipitation bath method, was impregnated with a dispersion of a fluorine-containing polymer in a downstream oleophobization step and subsequently thermally treated with crosslinking of the polymer (as described in DE 10 2010 044 648.3-44), is inserted into a disposable fermentation vessel. During autoclaving of the vessel, moisture accumulates within the interior and condenses after cooling on the venting filter too. Drops of up to 20 µL accumulate and adhere to the internal outer main surface of the membrane. Only from a larger drop volume (>20 µL) is their weight sufficient in order to cause slippage from the surface and to no longer cover the venting area. The described adhesion of the drops leads to a reduced permeability to air with respect to the free membrane surface and thus to the need for a larger aeration area in order to allow airflow necessary to prevent bursting of the fermenter.

An oleophobic planar filter membrane having the same structure as described above is provided with a surface roughness induced according to the invention, by guiding a rotating steel roller of diameter 10 cm having an incised rhomboid structure at 1000 rpm and a contact pressure of 0.7 N across the counter-directed membrane. Analogously to the above-described process, this polymer membrane according to the invention is inserted into the venting filter. Following autoclaving and during cooling of the unit, there is likewise condensation of the steam on the internal outer surface of the membrane. Owing to the increased contact angle, there is already spontaneous drip-off of microdroplets of the condensate having a volume of less than 5 µL on the internal outer main surface of the membrane. In contrast to the nonroughened internal outer membrane surface, no significant losses in permeability to air occur in the case of the membrane according to the invention.

Example 2

A 1% strength BSA solution (BSA=bovine serum albumin) is initially charged in a reaction vessel, and rigorous agitation of the medium causes splashes to reach the oleophobic venting filter composed of polyvinylidene fluoride (PVDF, having a pore size of 1.2 µm). The hydrophobic filter material prevents penetration of the medium into the membrane. However, the surface tension of the medium, which is reduced with respect to water, leads to spreading of the liquid on the internal outer main surface of the PVDF planar filter membrane, resulting in reduced permeability to air.

An oleophobic planar filter membrane composed of polyethersulfone (PES, having a pore size of 1.2 µm) is guided past "type 691A" 400 grit sandpaper from Starcke GmbH that is continuously wetted with water, on the upper and lower side at a contact pressure of 1 N. The surface roughness of the filter membrane increases according to the invention, with minimal mechanical abrasion being continuously removed by the washing of the sandpaper. The use of the microporous, oleophobic polymer membrane according to the invention having increased surface roughness prevents, in the case of the above-described agitation, spreading of the medium on the internal outer membrane surface. The medium reduced in its surface tension and the increased contact angle of the surface of the medium with respect to water allow drip-off of the liquid, and so losses in permeability to air are prevented and proper functioning of the venting filter is ensured.

Example 3

A drop of ultrapure water of volume 5 µL is positioned on an inclined plane at an angle of 45° (see FIG. 3). The drop remains in place on a PES membrane having a customary smooth surface; in the case of the membrane roughened according to the invention as per example 2, the drop spontaneously drips off.

A 1% BSA solution in 50 mM Tris buffer is used instead of the ultrapure water. In this case, spreading and adhesion of the drop becomes apparent in the case of the membrane having a smooth surface, whereas the membrane surface roughened according to the invention, independently of its pore size, leads to spontaneous drip-off of the drop.

The invention claimed is:

1. A hydrophobic or oleophobic microporous polymer membrane having a structurally induced drip-off effect, wherein at least one main surface of the polymer membrane is roughened, has a surface roughness at a height of from more than 0.6 µm to 20 µm and has a contact angle with respect to water of at least 125° wherein the roughness of the at least one roughened main surface of the polymer membrane is generated by mechanical treatment and the polymer membrane is gamma radiation resistant up to 50 kGy.

2. The polymer membrane as claimed in claim 1, wherein the polymer membrane has a pore size of from 0.1 µm to 20 µm.

3. The polymer membrane as claimed in claim 1, wherein both main surfaces of the polymer membrane are roughened and have the same surface roughness.

4. The polymer membrane as claimed in claim 1, wherein both main surfaces of the polymer membrane are roughened and have a differing surface roughness.

5. The polymer membrane as claimed in claim 1, wherein at least one roughened main surface of the polymer membrane has a surface roughness at a height of from 1.0 µm to 20 µm.

6. The polymer membrane as claimed in claim 1, wherein the polymer membrane has a symmetric or asymmetric sponge structure.

7. The polymer membrane as claimed in claim 1, wherein the polymer membrane has an hourglass structure or funnel structure.

8. The polymer membrane as claimed claim 1, wherein the roughness of the at least one roughened main surface of the polymer membrane is achieved in the manufacturing process for the starting polymer membrane and the membrane is subsequently hydrophobically/oleophobically modified.

9. A method for producing a polymer membrane as claimed in any of claim 1, comprising the steps:
providing a hydrophobic or oleophobic starting polymer membrane; and
roughening at least one main surface of the starting polymer membrane by mechanical treatment.

10. A method for producing a polymer membrane as claimed in claim 1, comprising the steps:
providing a starting polymer membrane;

roughening at least one main surface of the starting polymer membrane by mechanical treatment; and subsequently hydrophobically or oleophobically modifying the polymer membrane roughened in the preceding step.

11. A method of using the polymer membrane as claimed in claim 1 comprising the steps of:

sterilizing the polymer membrane; and filtering a gaseous fluid with the sterilized polymer membrane.

12. A method of using the polymer membrane as claimed in claim 1 comprising the steps of:

placing the polymer membrane in a liquid containing system; and venting a gas through the polymer.

13. The polymer membrane as claimed in claim 1 wherein at least one roughened main surface of the polymer membrane has a surface roughness at a height of from 1 µm to 5 µm.

14. The polymer membrane as claimed in claim 1 wherein the polymer membrane has intrinsic hydrophobicity or oleophobicity and/or has been hydrophobically or oleophobically modified prior to and/or subsequent to the mechanical treatment.

* * * * *